United States Patent [19]

Morrisey

[11] Patent Number: 4,511,105

[45] Date of Patent: Apr. 16, 1985

[54] COMPARTMENTED, FILAMENT WOUND, ONE-PIECE AIRCRAFT FUEL TANKS

[75] Inventor: Edward J. Morrisey, Dayton, Ohio

[73] Assignee: The United States of America as represented by the Secretary of the Air Force, Washington, D.C.

[21] Appl. No.: 582,514

[22] Filed: Feb. 22, 1984

Related U.S. Application Data

[62] Division of Ser. No. 339,258, Jan. 13, 1982, Pat. No. 4,453,995.

[51] Int. Cl.³ .............................................. B64D 37/04
[52] U.S. Cl. .................................. 244/135 R; 220/1 B
[58] Field of Search ............... 244/128, 135 R, 135 B, 244/123; 220/1 B, 3, 22, 83, 900; 428/35, 36

[56] References Cited

U.S. PATENT DOCUMENTS

| | | | |
|---|---|---|---|
| 2,503,450 | 4/1950 | Nebesar | 244/123 |
| 2,697,483 | 12/1954 | Stanley | 220/3 |
| 2,895,635 | 7/1959 | Pollard et al. | 220/22 |
| 3,293,860 | 12/1966 | Stedfeld | 60/263 |
| 3,412,891 | 11/1968 | Bastone et al. | 156/173 |
| 3,480,498 | 11/1969 | Paul, Jr. | 156/175 |
| 3,480,499 | 11/1969 | Paul, Jr. | 156/175 |
| 3,486,655 | 12/1969 | Ragettli | 220/3 |
| 3,502,529 | 3/1970 | Borgnolo et al. | 156/172 |
| 3,615,999 | 10/1971 | Basier | 156/172 |
| 3,780,969 | 12/1973 | Nussbaum et al. | 244/123 |
| 3,962,506 | 6/1976 | Dunahoo | 156/173 |

Primary Examiner—Michael Ball
Attorney, Agent, or Firm—Donald J. Singer; Charles E. Bricker

[57] ABSTRACT

An external aircraft fuel tank is provided which comprises a filament-reinforced fuel cell assembled with aerodynamic end shapes having a plurality of layers of adhesive resin-impregnated filament wrappings over the assembly.

Also provided is a method for making the fuel tank.

6 Claims, 6 Drawing Figures

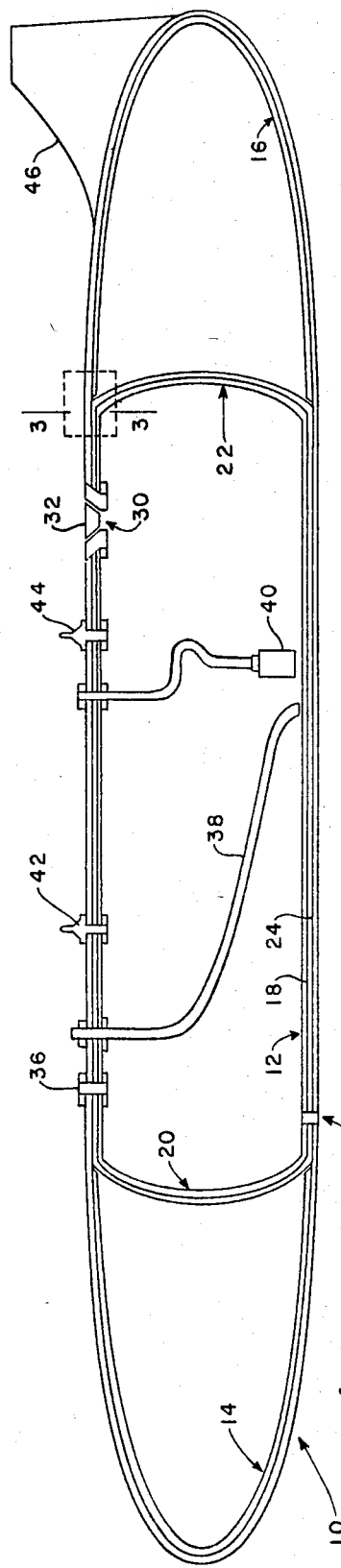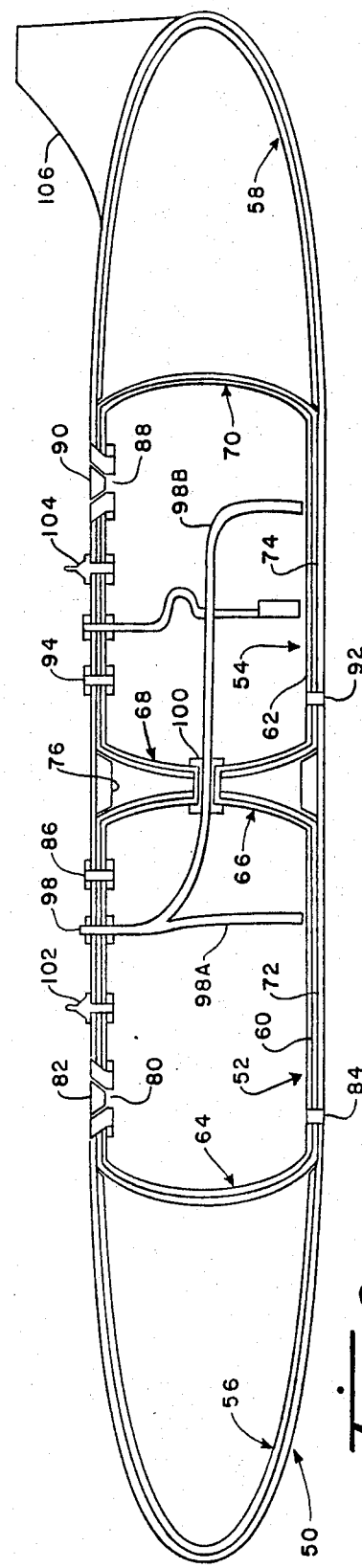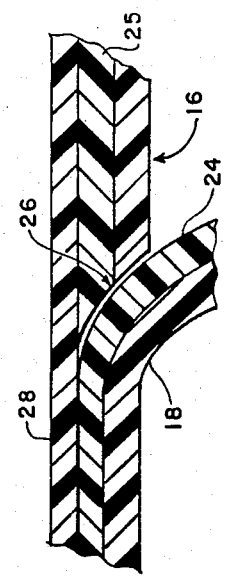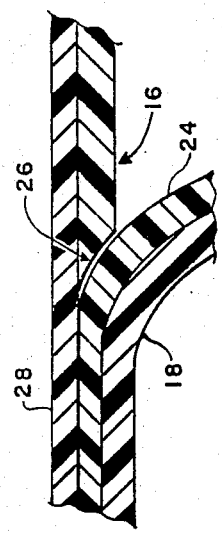

COMPARTMENTED, FILAMENT WOUND, ONE-PIECE AIRCRAFT FUEL TANKS

RIGHTS OF THE GOVERNMENT

The invention described herein may be manufactured and used by or for the Government of the United States for all governmental purposes without the payment of any royalty.

This is a division of application Ser. No. 339,258, filed Jan. 13, 1982, now U.S. Pat. No. 4,453,995.

BACKGROUND OF THE INVENTION

This invention relates to aircraft fuel tanks.

Aircraft in general and military aircraft in particular are limited as to their operating range due to limitations in the amount of fuel carried on board. The operating range of aircraft can be extended by adding external fuel tanks to the aircraft. These external tanks are generally made detachable or jettisonable so that, depending upon circumstances, the tanks can be easily removed or discarded.

An important factor in the selection of external fuel tanks is the weight of the tank itself. Such weight is a non-payload weight. Each unit of weight of the external fuel tank means a loss in operational efficiency, in terms either of operating range or of operating characteristics of the aircraft. Accordingly, there exists a need for lower weight external aircraft fuel tanks.

These external aircraft fuel tanks should be useable at a temperature in the range of $-65°$ to $+200°$ F. and a pressure in the range of $-5$ to $+100$ psi.

It is therefore an object of this invention to provide an improved external aircraft fuel tank.

It is another object of this invention to provide a method for fabricating an external aircraft fuel tank.

Other objects and advantages of the present invention will be apparent to those skilled in the art from the following disclosure and the appended claims.

SUMMARY OF THE INVENTION

In accordance with the present invention, there is provided an improved fuel tank for external mounting on an aircraft which comprises at least one elongated, generally cylindrical fuel cell having generally dome-shaped end portions, first and second aerodynamic end shapes, fuel filling and transfer fitments and means for attaching the tank to an aircraft. More particularly, the fuel cell or cells are formed of a plurality of layers of adhesive resin-impregnated filament wrappings, the aerodynamic end shapes are generally parabolic cone-like shapes fitted with their open ends over the endmost dome-shaped end portions of the fuel cell(s), and the whole assembly is wrapped with a plurality of layers of adhesive resin-impregnated filament windings. The normal fuel filling and transfer fitments, attachment means and, optionally, fin-like means for imparting aerodynamic stability to the tank, complete the assembly of the external fuel tank. The tank and the method for making the tank are more completely described below.

BRIEF DESCRIPTION OF THE DRAWINGS

In the drawings:

FIG. 1 is a longitudinal section of one embodiment of the invention;

FIG. 2 is a sectional view of another embodiment of the invention;

FIG. 3 shows in cross section a detail of the tank wall, taken at section 3—3 of FIG. 1;

FIG. 4 illustrates an alternative to the detail shown in FIG. 3;

DETAILED DESCRIPTION OF THE DRAWINGS

Figure 5:
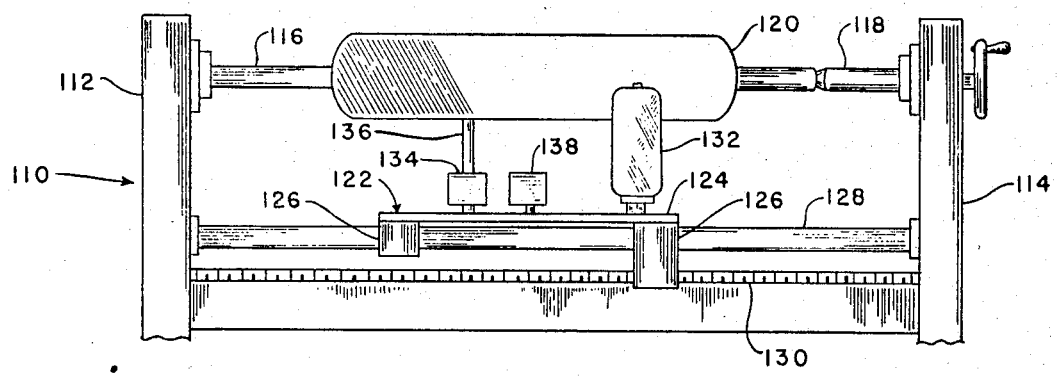
FIG. 5 illustrates a method for winding a fuel cell.

Referring now to FIGS. 1 and 3 of the drawings, a typical fuel tank 10 embodying the present invention is illustrated. The tank 10 comprises a fuel cell 12, and first and second end shapes 14 and 16, respectively. The fuel cell 12 is formed of a fuel resistant liner 18 having generally dome-shaped end portions 30 and 22 which is reinforced by a plurality of layers or laminations of adhesive resin-impregnated filament windings 24. The liner 18 may be made of any material which is light-weight and is resistant to degradation by the fuels normally used in aircraft, i.e., the liner 18 should be inert to and insoluble in aviation gasoline and jet fuel. Suitable materials for the liner include thermoplastic materials such as cross-linked polyethylene, polyesters, including polyester elastomers, acetals, polyamides and the like. The fuel cell liner 18 can be injection or rotational molded in sections, then joined together, or it can be blow molded, for example, from tubing, in one piece. The filament used in forming the fuel cell 12 may be made of any suitable material having high strength and high modulus, such as glass fiber roving, glass fiber yarn, graphite fiber or yarn, aromatic polyamide fiber or yarn and the like. The shape and thickness of the filament may vary depending upon the structural characteristics desired. For maximum reinforcement, continuous filament materials, such as roving and untwisted yarn, are preferred. For maximum low weight, untwisted single-end yarns are most suitable.

Any suitable thermosetting adhesive resin, such as polyester and epoxy resin systems, having the requisite bonding and structural properties may be employed to impregnate the filament windings or wrappings forming the fuel cell 12. Although epoxy resins are generally preferred, for instance, the epoxy resin compositions disclosed in U.S. Pat. No. 2,935,488, Phillips et al, may be satisfactorily employed in accordance with the present invention to impregnate the filament windings.

The filament windings may be helical, helical loop, or helical windings interspersed with substantially longitudinal windings, the latter being disclosed in U.S. Pat. No. 3,486,655, Ragettli. If only helical winding is employed, it is preferred that the winding angle of each layer be different in each succeeding layer, such difference in angle being in terms of magnitude and/or of direction.

As shown in FIG. 1, the end portions 20 and 22 of the fuel cell 12 are dome-shaped. Located in association with each of these end portions are end shapes 14 and 16, respectively. End shapes 14 and 16 are aerodynamically shaped, generally being parabolic. The open end of each of the end shapes has an outside diameter approximately equal to the outside diameter of fuel cell 12. Preferably, this open end has an inside bevel, as indicated, for example, at 26 in FIG. 3, having a slope or shape complementary to the shape of the end portion at the point of juncture. The end shapes 14 and 16 may be made of any suitable material, including the materials employed for making cell liner 18.

Fuel cell 12 with end shapes 14 and 16 assembled therewith is reinforced by a plurality of layers 28 of adhesive resin-impregnated filament. The filament and the adhesive resin in layers 28 may be the same as the materials used in reinforcing layers 24. The filament windings in layers 28 may be applied in the fashion described previously. For additional strength, it may be desirable to reinforce each end shape 14 and 16 separately with a plurality of layers 25 of adhesive resin-impregnated filament, as shown, for example, in FIG. 4.

Fuel tank 10 is provided with fuel filling opening 30 which includes a closure or stopper 32, a drain fitting 34, tank vent 36, suitable conduit 38 for withdrawing fuel from cell 12 and fuel level sensing means 40. Tank 10 is also provided with lugs 42 and 44 for detachably mounting tank 10 to an aircraft. Tank 10 may also be provided on at least one end thereof with at least one stabilizing fin 46.

FIG. 2 illustrates another embodiment of the present invention. Fuel tank 50 comprises fuel cells 52 and 54 and first and second end shapes 56 and 58. Fuel cells 52 and 54 have fuel resistant liners 60 and 62, each having generally dome-shaped end portions 64, 66, 68 and 70. Liners 60 and 62 are each reinforced by a plurality of layers or laminations of adhesive resin-impregnated filament windings 72 and 74, respectively. The liners 60 and 62 may be made of the same material as liner 18. Likewise, the filament and the adhesive resin may be the same as previously described.

Spacer 76 is provided between adjacent fuel cells 52 and 54. Spacer 76 helps to provide a relatively smooth and continuous outer surface for the plurality of layers 78 of adhesive resin-impregnated filament which reinforces the whole assembly.

Fuel tank 50 is provided with fuel filling opening 80 which includes closure 82, drain fitting 84 and vent 86 for fuel cell 52; and fuel filling opening 88 and closure 90 therefor, drain fitting 92 and vent 94 for fuel cell 54. A single fuel level sensor 96 is illustrated in fuel cell 54. Conduit 98 having branches 98A simultaneously. Sealing means 100 are provided between the adjacent domed ends 66 and 68 to interconnect the cells 52 and 54, and to prevent fuel from getting into the void defined by the outsides of ends 66 and 68 and spacer 76. Tank 50 is also provided with mounting lugs 102 and 104 and at least one stabilizing fin 106.

Referring now to FIG. 5, there is illustrated winding machine 110 having end supports 112 and 114 with winding spindles 116 and 118 for releasably receiving fuel cell liner 120. To rotate liner 120, it is coupled for rotation to spindle 116 which in turn is driven by drive means (not shown) housed in end support 112.

Roving carriage 122 is adapted to traverse back and forth along liner 120 to feed adhesive resin-impregnated filament to the liner. The carriage comprises platform 124 having bearings 126 that are slidably mounted on a pair of supporting rods 128 extending between end supports 112 and 114 and parallel to the central axis of spindles 116 and 118 and liner 120, whereby platform 124 is supported for movement in a path parallel to the axis of spindles 116 and 118 and liner 120. For driving platform 124 back and forth there is lead screw 130 which is driven by reversible drive means (not shown) housed in end support 112.

Platform 124 carries at least one spool 132 of reinforcing filament, an impregnator 134, guide arm 136 and tensioning mechanism 138. From spool 132 the filament passes through the tensioning mechanism 138, which imposes a selected winding tension on the filament, through impregnator 134, in which the filament is impregnated with the adhesive resin, and thereafter to the guide arm 136 which guides the adhesive resin-impregnated filament onto liner 120.

In operation in the usual manner, roving carriage 122 is moved back and forth along liner 120, which, as it rotates, draws the filamentary material from the supply spool 132, through tensioning mechanism 138, impregnator 134 and out guide arm 136. The pattern in which the filament is laid upon liner 120 is a function of the speed of rotation of the liner relative to the speed of traverse of carriage 122.

Conventional methods may be used for curing the adhesive resin, such as by heating. Self-curing resins may also be used so that the curing step involves exposing the resin to air. It is advantageous if the resin system has a long enough pot life at room temperature to permit winding of the entire fuel cell before the system gels. It is also advantageous if the resin system is a liquid of low viscosity at room temperature so that the winding may be easily carried out.

Figure 6:
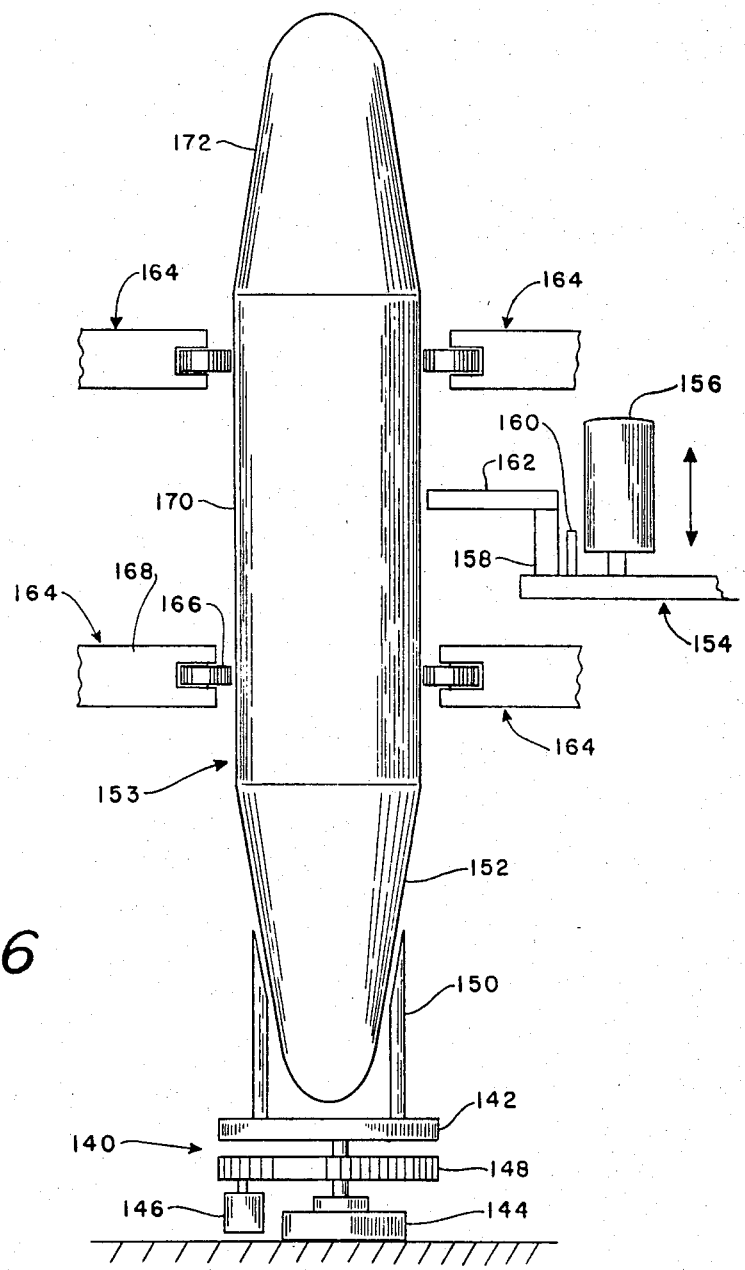
FIG. 6 illustrates a method for winding a complete tank assembly.

Referring now to FIG. 6, there is illustrated winding apparatus 140 having rotatable table 142 mounted on base 144 and rotatably driven by motor 146 through gearing 148. Table 142 has supporting brackets 150 for receiving first end shape 152 of tank 153.

A roving carriage 154 is adapted to traverse upwardly and downwardly parallel to the rotational axis of table 142 and tank 153 to feed resin-impregnated filament onto tank assembly 153. The means for supporting and moving carriage 154 are similar to supporting rod 128 and lead screw 130 and are, therefore, not illustrated and not further described herein. Carriage 154 carries at least one spool 156 of reinforcing filament, impregnator 158, tensioning mechanism 150 and guide arm 162.

A plurality of steady rests 164 are provided at desired vertical and axial positions to support tank assembly 153 in a vertical position. Each steady rest 164 comprises guide wheel 166 rotatably mounted in an adjustable yoke 168, the yoke being adjustable vertically as well as toward and away from tank assembly 153.

In operation, a filament-reinforced fuel cell 170 is assembled with first end shape 152 at one end thereof and second end shape 172 at the opposite end to provide tank assembly 153. Tank assembly 153 is positioned onto brackets 150 of table 142. Steady rests 164 are positioned to maintain tank assembly 153 vertical during the filament winding step.

Roving carriage 154 is moved upwardly and downwardly along tank assembly 153 which, as it rotates, draws the filamentory material from supply spool 156, through tensioning mechanism 160, impregnator 158 and out through guide arm 162. The pattern in which the filament is laid upon tank assembly 153 is a function of the speed of rotation of the tank assembly relative to the speed of traverse of carriage 154. It will be necessary to turn tank assembly 153 end-for-end at least once during the winding step to apply the reinforcement to both end shapes.

In the case of a tank assembly comprising two or more fuel cells, it will be necessary to assemble the adjacent cells with spacer 76 and sealing means 100 therebetween as illustrated in FIG. 2.

After completion of the winding step, the resulting reinforced tank assembly is cured.

The cured tank assembly is then fitted with all necessary fitments which make it functional as a fuel tank.

Although the method of making the aircraft fuel tank of this invention has heretofore been described in terms of winding the reinforcing filamentory material onto the fuel cell and the complete tank assembly, it should be recognized that the reinforcing material can also be braided using suitable braiding apparatus.

While the invention has been described herein with a certain degree of particularity, it is understood that the present disclosure has been made only as an example and that various modifications and changes may be made within the scope of the invention.

I claim:

1. A fuel tank for external mounting on an aircraft which comprises:
    a. at least one elongated, generally cylindrical fuel cell having generally dome-shaped end portions, said fuel cell being formed of a plurality of layers of adhesive resin-impregnated filament wrappings, and having an imaginary central longitudinal axis;
    b. first and second aerodynamic end shapes, each having an open end having an outer diameter approximately equal to the outer diameter of said fuel cell, said open end of each of said end shapes having an inside bevel having a slope complimentary to the shape of said end portion of said cell, and each end shape having an imaginary central longitudinal axis, said first and second end shapes being positioned at each end of said fuel cell with the open ends of said end shapes over the endmost portions of said fuel cell and with the axes of said end shapes juxtaposed with the axis of said fuel cell;
    c. a plurality of outer layers of adhesive resin-impregnated filament wrappings surrounding said fuel cell and said end shapes, thereby providing an integral structure;
    d. fuel filling and transfer fitments comprising means for filling said cell, means for draining said cell, fuel level sensing means, means for venting said cell and means for withdrawing fuel from said cell;
    e. means for detachably mounting said tank to an aircraft; and
    f. means attached to at least one of said end portions for imparting aerodynamic stability to said fuel tank.

2. The fuel tank of claim 1 wherein said end shapes are generally parabolic.

3. The fuel tank of claim 1 wherein the number of fuel cells is greater than one, further comprising spacing means between adjacent fuel cells to provide a relatively smooth and continuous outer surface for said outer layers of filament wrappings, and sealing means between adjacent fuel cells to interconnect said cells.

4. The fuel tank of claim 1 wherein said fuel cell is a fuel resistant thermoplastic liner reinforced by a plurality of layers of adhesive resin-impregnated filament windings.

5. The fuel tank of claim 4 wherein said end shapes are made of a fuel resistant thermoplastic material.

6. The fuel tank of claim 4 wherein said end shapes comprise a fuel resistant thermoplastic shape reinforced by a plurality of layers of adhesive resin-impregnated filament windings.

* * * * *